(12) United States Patent  
El-Kassouf

(10) Patent No.: US 6,508,336 B1
(45) Date of Patent: Jan. 21, 2003

(54) REDUCED DRAG WET DISC BRAKE ASSEMBLY

(75) Inventor: Raji El-Kassouf, Sterling Heights, MI (US)

(73) Assignee: Meritor Heavy Vehicle Systems, LLC, Troy, MI (US)

(*) Notice: Subject to any disclaimer, the term of this patent is extended or adjusted under 35 U.S.C. 154(b) by 0 days.

(21) Appl. No.: 09/498,442

(22) Filed: Feb. 4, 2000

(51) Int. Cl.[7] .......................... F16D 55/36; F16D 55/02; F16D 67/02
(52) U.S. Cl. .................... 188/71.5; 188/71.2; 188/72.3; 192/18 R
(58) Field of Search .............................. 188/71.5, 72.3, 188/72.1, 72.4, 72.5, 71.2; 192/18 A, 18 R, 114 T, 70.21, 70.22

(56) References Cited

U.S. PATENT DOCUMENTS

| | | | |
|---|---|---|---|
| 2,968,369 A | * | 1/1961 | Parrett ........................ 188/152 |
| 3,907,073 A | * | 9/1975 | Harrison ..................... 188/71.2 |
| 3,946,840 A | * | 3/1976 | Sommer ..................... 192/18 A |
| 4,567,965 A | * | 2/1986 | Woodruff ..................... 188/68 |
| 5,765,673 A | * | 6/1998 | Nishiyama et al. ..... 192/85 AA |
| 5,937,979 A | * | 8/1999 | Cummings ................ 192/18 A |

* cited by examiner

Primary Examiner—Jack Lavinder
Assistant Examiner—Melody M. Burch
(74) Attorney, Agent, or Firm—Carlson, Gaskey & Olds

(57) ABSTRACT

A disc brake assembly includes a stationary member, a rotating member defining an axis of rotation, a plurality of stationary discs spaced axially along the axis of rotation within the stationary member, and a plurality of movable discs interspaced with the stationary discs. A brake coupler supports the movable discs. During non-braking vehicle operation, the movable discs and the brake coupler remain stationary relative to the stationary discs. During a braking maneuver, the coupler couples the movable discs to the rotating member such that the movable discs are caused to rotate with respect to the stationary discs. Once the coupler and rotating member are interconnected a piston moves the stationary and movable discs together to reduce rotation of the rotating member and brake the vehicle. Once the braking maneuver is completed, a first return spring moves the stationary and movable discs apart and a second spring disengages the coupler from the rotating member to return the movable discs to their original position. This eliminates undesirable drag that occurs between stationary and rotating discs in a disc brake during non-braking vehicle operation.

22 Claims, 2 Drawing Sheets

REDUCED DRAG WET DISC BRAKE ASSEMBLY

BACKGROUND OF THE INVENTION

This invention relates to an improvement in a wet disc brake assembly having a set of stationary discs and a set of movable discs wherein a brake coupler is used to selectively couple the movable set of discs to a rotating member only during braking maneuvers.

Wet disc brakes are utilized in many vehicle braking applications. They can also be used in many non-vehicle braking applications. In particular, a number of rotating discs are provided with a friction surface, and are connected for rotation with a wheel hub or other rotating member. The discs are slidable axially along the wheel hub. The rotating discs are interspaced with stationary discs which are connected to an outer stationary member. The stationary discs are also axially slidable relative to the outer stationary member.

A hydraulic chamber is associated with a piston, and when hydraulic fluid is delivered to the chamber, the piston moves to axially compress the rotating and stationary discs together to reduce the rotation of the rotating member relative to the stationary member.

These types of brakes typically include a plurality of interspaced stationary and rotating discs. Often, as many as ten rotating discs are used in combination with eleven stationary discs.

The rotating and stationary discs are mounted within a fluid chamber formed between the stationary and rotating members. During a braking maneuver, the piston forces the stationary and rotating discs together, which increases the friction between the discs. As the friction increases, the rotational speed of the rotating member is decreased.

One disadvantage with this configuration is that during non-braking vehicle operation, the rotating discs are continuously rotating in the fluid stored in the fluid chamber. This creates an undesirable drag effect. Drag decreases the operating efficiency of the rotating member. Additional energy is required to rotate the rotating member at a specified speed due to the drag. The drag also causes premature wear on the rotating disc members.

If drag could be eliminated during non-braking vehicle operations, the wear life of the discs and the operating efficiency of the vehicle could be increased.

SUMMARY OF THE INVENTION

In a disclosed embodiment of this invention, a disc brake assembly includes a stationary member and a rotating member supported for rotation with respect to the stationary member. The rotating member defines a central axis of rotation. A first set of discs extends axially along the axis of rotation within the stationary member and a second set of discs is interspaced with the first set of discs. A coupler selectively couples the second set of discs to the rotating member for rotation therewith about the axis.

The coupler couples the second set of discs to the rotating member only when a braking maneuver is initiated. Thus, during non-braking vehicle operation there is no relative rotation between the first and second set of discs and the drag effect is eliminated.

In a preferred embodiment, a first actuator is supported by the stationary member and applies an actuating force to move the coupler into engagement with the rotating member when the braking maneuver is initiated. Once the second set of discs is coupled to the rotating member, a second actuator moves the first set of discs and the second set of discs together to reduce rotation of the rotating member and brake the vehicle. Once the braking maneuver is completed, a first resilient return mechanism moves the first and second set of discs away from one another to allow the rotating member to rotate freely about the axis rotation. A second resilient return mechanism is then used to disengage the coupler from the rotating member such that the first and second sets of discs are stationary relative to each other, i.e., there is no drag.

The preferred inventive method for braking a vehicle wheel with a disc brake assembly includes the steps of: providing the disc brake assembly with a stationary member, a rotating member supported for rotation with respect to the stationary member and defining a central axis of rotation, a first set of stationary discs spaced axially along the axis of rotation within the stationary member, and a second set of discs interspaced with the first set of discs; initiating a braking maneuver; coupling the second set of discs with the rotating member such that the second set of discs rotate with respect to the first set of stationary discs; and moving the first set of stationary discs and the second set of discs together to reduce rotation of the rotating member.

These and other features of the present invention can be best understood from the following specification and drawings, the following of which is a brief description.

DETAILED DESCRIPTION OF A PREFERRED EMBODIMENT

Figure 1:
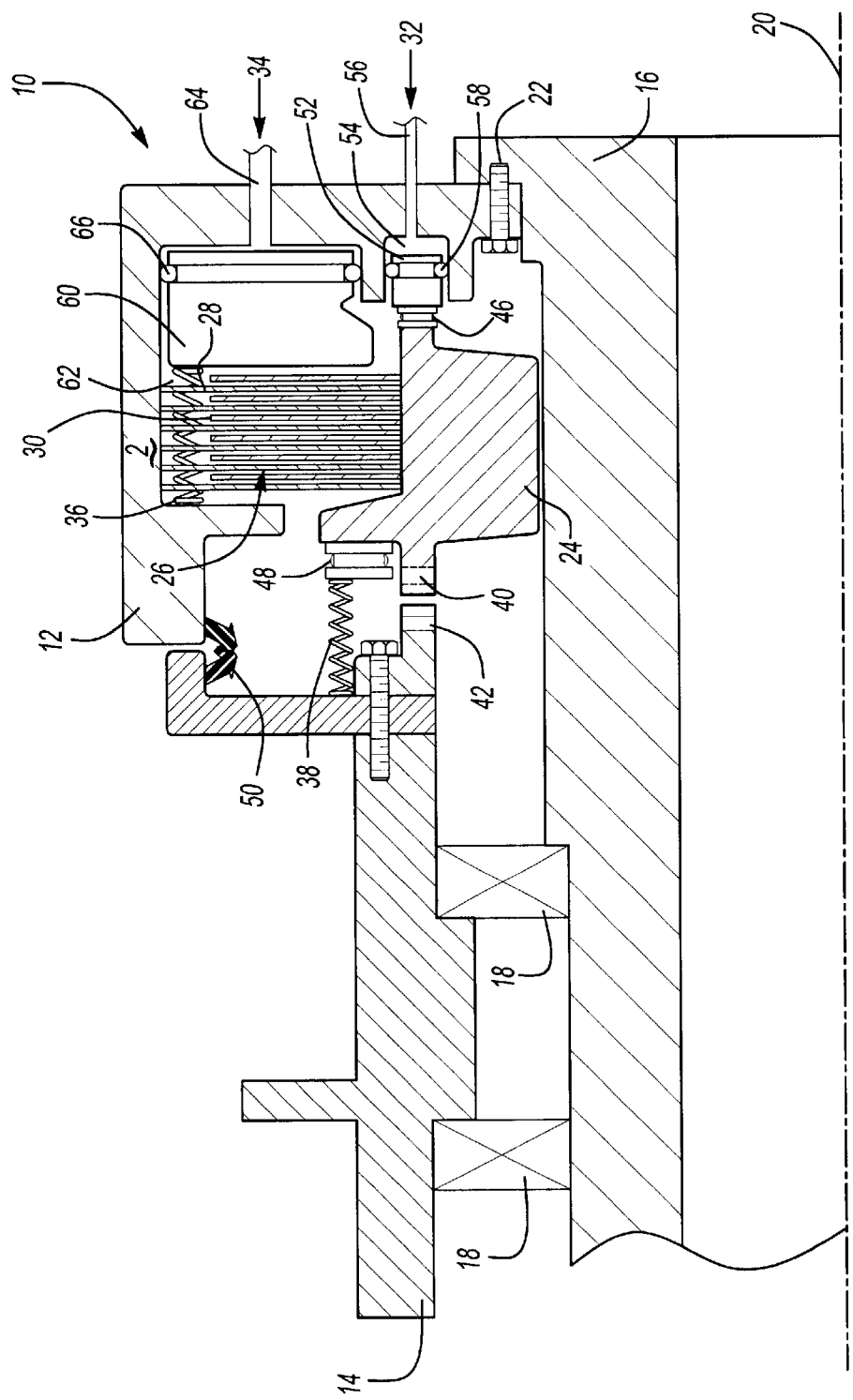
FIG. 1 is a cross-sectional view through a brake according to the present invention.

An inventive brake system 10 is illustrated in FIG. 1 has a stationary brake housing member 12 mounted to a fixed vehicle structure. A rotating hub member 14 is rotatably supported on an axle spindle 16 by a plurality of bearings 18 and defines an axis of rotation 20. A vehicle wheel (not shown) is mounted for rotation with the hub 14. The housing 12 is preferably mounted to the spindle 16 by a plurality of bolts 22 (only one is shown). The brake that is shown is typically used in off-road vehicle applications, although it should be understood that this type of brake is also used in many non-vehicle applications. Examples include boat anchor lifts or aircraft braking systems, etc.

A brake coupler 24 is mounted within the housing 12 and is selectively engagable with the rotating hub 14 under certain conditions. The brake system 10 also includes a disc pack, shown generally at 26. The disc pack 26 includes a first set of discs 28 and a second set of discs 30 that are interspaced with the first set of discs 28. The disc pack chamber is immersed in oil or other fluid that is well known in the art. The discs 28 in the first set are spaced axially along the axis of rotation 20 within the stationary housing member 12. The first set of discs 28 are preferably stationary discs that are mounted to the stationary brake housing 12 and the second set of discs 30 are mounted to the coupler 24. A preferred mounting method splines the discs 28, 30 to the respective mounting member 12, 14. The coupler 24 selectively couples the second set of discs 30 to the rotating hub 14 for rotation therewith about the axis of rotation 20.

Thus, the second set of discs 30 are movable discs interspaced with the stationary discs 28 and which have a first operating position where there is no relative rotation between the stationary 28 and movable 30 discs and a second operating position where the movable discs 30 rotate with respect to the stationary discs 28. The coupler 24 couples the movable discs 30 to the hub 14 only during braking maneuvers. The coupler 24 is axially movable between a non-braking position where there is no relative rotation between the stationary housing 12 and the coupler 24 and a braking position wherein the coupler 24 rotates with respect to the stationary housing 12. The coupler 24 moves the movable discs 30 from the first operating position to the second operating position when the braking maneuver is initiated.

A first actuator 32 is supported by the stationary housing 12 to apply an actuating force to move the coupler 24 into engagement with the rotating hub 14. The first actuator 32 applies an actuating force to move the coupler 24 from the non-braking position to the braking position when the actuator 32 receives a braking command. This will be discussed in greater detail below.

A second actuator 34 is used to move the first set of discs 28 and the second set of discs 30 together to reduce rotation of the rotating hub 14 only after the first actuator 32 has coupled the coupler 24 to the hub 14. A first resilient return mechanism 36 moves the first 28 and second 30 set of discs away from one another to allow the rotating hub 14 to rotate freely about the axis 20 after the braking maneuver is completed. A second resilient return mechanism 38 then disengages the coupler 24 from the hub 14 such that the first 28 and second 30 sets of discs are stationary relative to each other.

Figure 2:
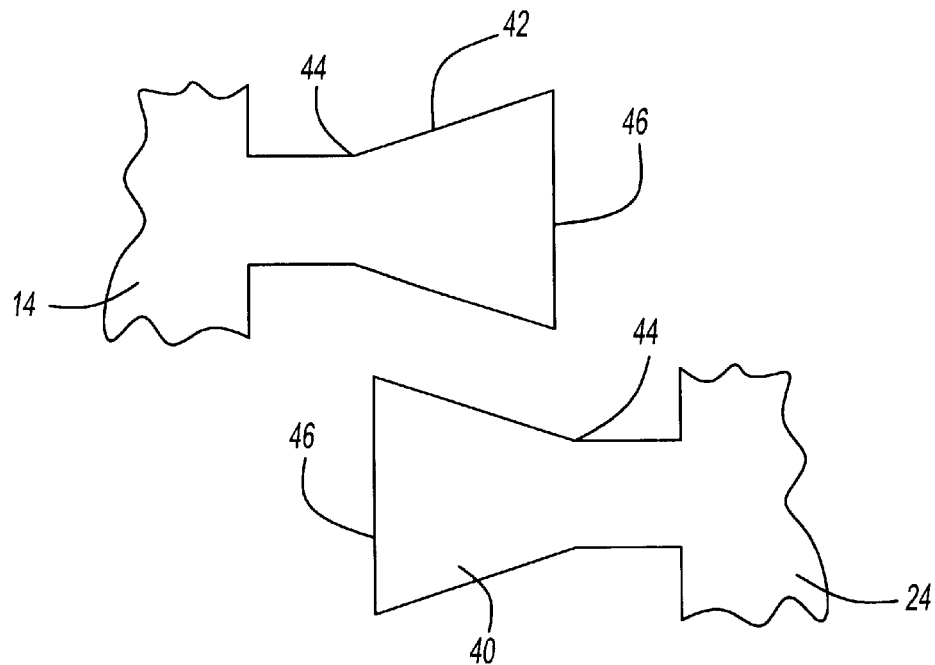
FIG. 2 is an enlarged view of a portion of a FIG. 1 brake.

As shown more clearly in FIG. 2, the coupler 24 includes a first plurality of clutch teeth 40 and the hub 14 includes a second plurality of clutch teeth 42. The first 40 and second 42 sets of clutch teeth intermesh to fix the coupler 24 to the hub for rotation therewith when brake actuation torque is below a certain predetermined level, i.e., low torque situations. At this initial stage there is either no torque or very low torque so that engagement is quick and efficient. The teeth 40, 42 are preferably designed such that as long as brake torque is required, i.e., the stationary 28 and movable 30 plates are being compressed together, the teeth 40, 42 cannot be disengaged from each other at all.

The first 40 and second 42 sets of clutch teeth are defined by a tooth profile having a base 44 and a distal end 46. The base 44 is preferably narrower in width than the distal end 46. While clutch teeth 40, 42 are preferred, it should be understood that other engagement mechanisms known in the art could also be used to couple the coupler 24 to the hub 14. Also, while it is preferred that the hub clutch teeth 42 are formed on the hub 14, it should be understood that a toothed collar or other member could be separately attached to the hub 14.

The first resilient return mechanism 36 is preferably return spring that reacts between the stationary housing 12 and the second actuator 34. The return spring moves the stationary 28 and movable 30 discs away from each other to allow the hub 14 to rotate freely when a braking control actuator 72 (see FIG. 3), such as a brake pedal, for example, is moved from the applied position to the rest position.

The second resilient return mechanism 38 is preferably a second return spring that reacts between the hub 14 and the coupler 24 to disengage the coupler 24 from the hub 14 after the braking actuator 44 is moved to the rest position. A first needle bearing 46 is mounted between the first actuator 32 and the coupler 24 and a second needle bearing 48 is mounted between the second return spring 38 and the coupler 24. A face seal 50 is mounted between the stationary 12 and rotating 14 members to keep out dirt and other contaminants.

It should be understood that the first 32 and second 34 actuators can be any known actuating mechanisms in the art including by hydraulic, pneumatic, mechanical, or electrical actuation. Preferably the first actuator 32 is a first piston 52 that engages the coupler 24 to move the movable discs 30 axially along the axis 20 to couple the movable discs 30 to the hub 14. The first actuator 32 includes a sealed chamber 54 that slidably receives the piston 52. The chamber 54 is positioned such that when a pressurized fluid is delivered to the chamber 54 through a connection 56, the piston 52 is driven to the left as shown in FIG. 1. A seal 58, such as an O-ring, for example, surrounds the piston 52 to prevent pressure loss and leakage.

Preferably the second actuator 34 is a second piston 60 that compresses the stationary 28 and movable 30 discs together. The second actuator 34 includes a sealed chamber 62 that slidably receives the piston 60. The chamber 62 is positioned such that when a pressurized fluid is delivered to the chamber 62 through a connection 64, the piston 60 is driven to the left as shown in FIG. 1. A seal 66, such as an O-ring, for example, surrounds the piston 60 to prevent pressure loss and leakage. The second piston 60 forces the stationary 28 and movable 30 discs together only after the first piston 52 has moved the brake coupler 24 from the non-braking position to the braking position.

The return spring 36 normally biases the piston 60 to the right as shown in FIG. 1. The pressurized hydraulic fluid acts to move the piston 60 against the force of spring 36, and compress the disc pack 26.

The inventive method of braking a vehicle wheel with a disc brake assembly includes the following steps. As discussed above, the disc brake assembly 10 includes a stationary housing 12, a rotating member 14 supported for rotation with respect to the stationary housing 12, a first set of stationary discs 28, and a second set of discs 30 interspaced with the first set of discs 28. Once the braking maneuver is initiated, the second set of discs 30 is coupled with the rotating member 14 such that the second set of discs 30 rotate with respect to the first set of stationary discs 28. The first set of stationary discs 28 and the second set of discs 30 are then moved together to reduce rotation of the rotating member 14.

Figure 3:
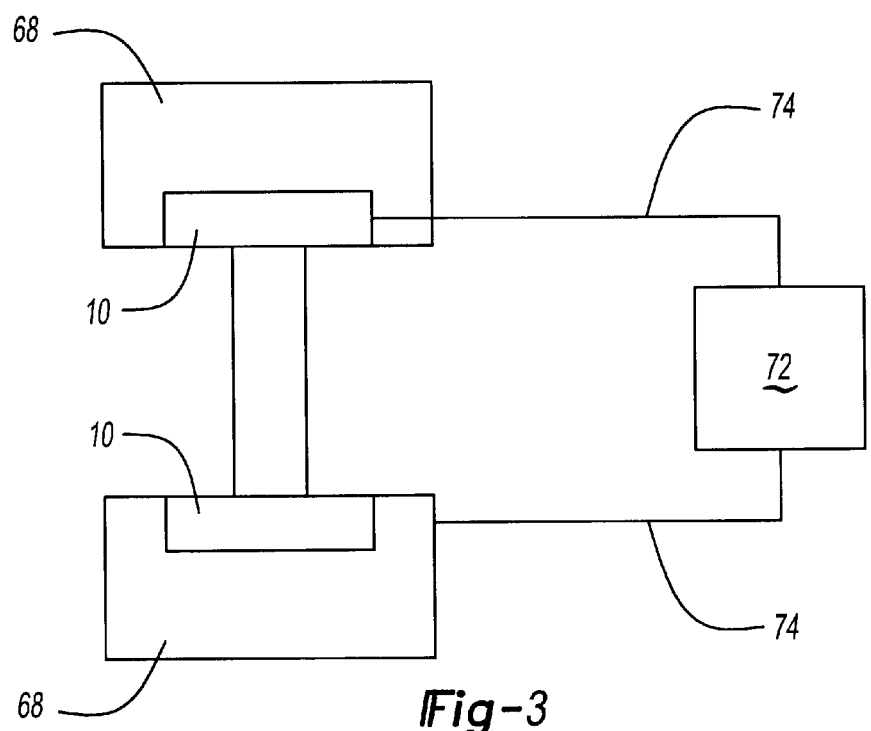
FIG. 3 is a schematic view of the braking system.

As shown in FIG. 3, a wet disc brake assembly 10 is mounted each wheel end 68 of an axle 70. When a braking control actuator 72 is activated, a braking signal 74 is sent to each wet disc brake assembly. The braking control actuator 72 can be a brake pedal, a vehicle system computer, or other processing control unit. The braking signal 74 can be a mechanical signal or an electrical signal. Once the brake assembly 10 receives the signal 74 indicating that braking is required, the brake coupler 24 is coupled to the hub 14 to cause the movable discs 30 to rotate with respect to the stationary discs 28. Immediately after this occurs, the discs 28, 30 are compressed together to decrease the rotational speed of the hub 14 and brake the vehicle. It should be understood that the time interval between the coupling and the disc compression is minimal such that braking speed and efficiency are not compromised. Once the braking maneuver is completed, the discs 28, 30 are released and subsequently the coupler 24 is disengaged from the hub 14. Preferably a 2–5 second interval passes before the coupler 24 is disengaged.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A disc brake assembly comprising:

a stationary member;

a rotating member supported for rotation with respect to said stationary member and defining a central axis of rotation;

a first set of non-rotating discs extending axially along said axis of rotation within said stationary member;

a second set of discs interspaced with said first set of discs; and a coupler for selectively coupling said second set of discs to said rotating member for rotation relative to said first set of non-rotating discs by moving said second set of discs linearly along said axis of rotation.

2. An assembly as recited in claim 1 including a first actuator supported by said stationary member for applying an actuating force to move said coupler into engagement with said rotating member when a first predetermined condition is achieved.

3. An assembly as recited in claim 2 including a second actuator for moving said first set of discs and said second set of discs together to reduce rotation of said rotating member when a subsequent second predetermined condition is achieved.

4. An assembly as recited in claim 3 including a first resilient return mechanism for moving said first and second set of discs away from one another to allow said rotating member to rotate freely about said axis.

5. An assembly as recited in claim 4 including a second resilient return mechanism for disengaging said coupler from said rotating member such that said first and second sets of discs are stationary relative to each other.

6. An assembly as recited in claim 1 wherein said coupler includes a first set of clutch teeth and said rotating member includes a second set of clutch teeth, said first and second sets of clutch teeth intermeshing to fix said coupler to said rotating member for rotation therewith when brake actuation torque is below a certain predetermined level.

7. A disc brake assembly comprising:

a stationary member;

a rotating member supported for rotation with respect to said stationary member and defining an axis of rotation;

a first set of discs extending axially along said axis of rotation within said stationary member;

a second set of discs interspaced with said first set of discs; and a coupler for selectively coupling said second set of discs to said rotating member for rotation therewith about said axis of rotation, said coupler including a first set of clutch teeth and said rotating member including a second set of clutch teeth, said first and second sets of clutch teeth intermeshing to fix said coupler to said rotating member for rotation therewith when brake actuation torque is below a certain predetermined level wherein said first and second sets of clutch teeth are defined by a tooth profile having a base and a distal end, said base being narrower in width than said distal end.

8. A disc brake assembly comprising:

a stationary member;

a rotating member supported for rotation with respect to said stationary member and defining a central axis of rotation;

a plurality of stationary discs spaced axially along said axis of rotation within said stationary member;

a plurality of movable discs interspaced with said stationary discs and having a first operating position where there is no relative rotation between said stationary and movable discs and a second operating position where said movable discs rotate with respect to said stationary discs;

a coupler movable between a non-braking position where there is no relative rotation between said stationary member and said coupler and a braking position wherein said coupler rotates with respect to said stationary member, said coupler for selectively moving said movable discs linearly along said axis of rotation from said first operating position to said second operating position; and a coupler actuator for selectively moving said coupler from said non-braking position to said braking position when said coupler actuator receives a braking command.

9. An assembly as recited in claim 8 wherein said stationary discs are mounted to said stationary member and said movable discs are mounted to said coupler.

10. An assembly as recited in claim 9 wherein said coupler actuator is comprised of a first piston that engages said coupler to move said movable discs axially along said axis to couple said movable discs to said rotating member.

11. An assembly as recited in claim 9 including a braking actuator for moving said stationary discs and said movable discs together to reduce rotation of said rotating member when said braking actuator is moved from a rest position to an applied position.

12. An assembly as recited in claim 11 wherein said braking actuator is comprised of a second piston that forces said stationary and movable discs together only after said first piston has moved said brake coupler from said non-braking position to said braking position.

13. An assembly as recited in claim 12 including a first return spring reacting between said stationary member and said second piston to move said stationary and movable discs away from each other to allow said rotating member to rotate freely when said braking actuator is moved from said applied position to said rest position.

14. An assembly as recited in claim 13 including a second return spring reacting between said rotating member and said coupler to disengage said coupler from said rotating member after said braking actuator is moved to said rest position.

15. A method of braking a vehicle wheel with a disc brake assembly comprising the steps of:

(a) providing the disc brake assembly with a stationary member, a rotating member supported for rotation with respect to the stationary member and defining a central axis of rotation, a first set of stationary discs spaced axially along the axis of rotation within the stationary member, and a second set of discs interspaced with the first set of discs;

(b) initiating a braking maneuver;

(c) coupling the second set of discs with the rotating member such that the second set of discs rotate with respect to the first set of stationary discs by moving the second set of discs linearly along the axis of rotation;

(d) moving the first set of stationary discs and the second set of discs together to reduce rotation of the rotating member.

16. A method as recited in claim 15 wherein step (c) is performed before step (d).

17. A method as recited in claim 16 including the steps of supporting the second set of discs on a coupler, providing a first actuator for controlling the movement of the coupler, and moving the coupler axially along the axis with the first actuator to couple the coupler to the rotating member during step (c).

18. A method as recited in claim 17 including the steps of spacing the first set of stationary discs axially along the axis within the stationary member; providing a second actuator for controlling the movement of the second set of discs; and moving the first set of stationary discs and the second set of discs together with the second actuator to reduce rotation of the rotating member during step (d).

19. An assembly as recited in claim 1 wherein said first and second set of discs are immersed in a fluid.

20. An assembly as recited in claim 19 wherein said coupler is movable between a coupled position where said second set of discs are coupled to said rotating member during a braking condition and an uncoupled position where said second set of discs are uncoupled from said rotating member to reduce fluid drag during non-braking conditions.

21. An assembly as recited in claim 8 including a chamber formed between said stationary member and said rotating member for holding a fluid wherein said stationary and movable discs are immersed in said fluid.

22. An assembly as recited in claim 21 wherein said coupler actuator moves said coupler to said non-braking position to reduce fluid drag by prohibiting rotation of said movable discs within said fluid during non-braking conditions.

* * * * *